(12) United States Patent
Nathan

(10) Patent No.: US 7,180,504 B2
(45) Date of Patent: Feb. 20, 2007

(54) KEYBOARD MATRIX DATA TRANSFER

(75) Inventor: Robert H. Nathan, Atlanta, GA (US)

(73) Assignee: NCR Corporation, Dayrton, OH (US)

( * ) Notice: Subject to any disclaimer, the term of this patent is extended or adjusted under 35 U.S.C. 154(b) by 503 days.

(21) Appl. No.: 10/132,409

(22) Filed: Apr. 26, 2002

(65) Prior Publication Data
US 2003/0201981 A1 Oct. 30, 2003

(51) Int. Cl.
G09G 5/00 (2006.01)

(52) U.S. Cl. ........................................ 345/168; 341/23

(58) Field of Classification Search ................ 345/168; 341/22, 23; 709/225; 463/37, 39
See application file for complete search history.

(56) References Cited

U.S. PATENT DOCUMENTS 6,071,194 A * 6/2000 Sanderson et al. ............ 463/37
6,512,467 B1 * 1/2003 Hanko et al. .................. 341/22
6,654,806 B2 * 11/2003 Wall et al. .................... 709/225

FOREIGN PATENT DOCUMENTS

JP 08-272508 * 10/1996

OTHER PUBLICATIONS

Universal Serial Bus (USB), Device Class Definition for Human Interface Devices (HID, Firmware Specification-Jun. 27, 2001, Version 1.11, 1996-2001 USB Implementers' Forum.

* cited by examiner

Primary Examiner—Kent Chang
(74) Attorney, Agent, or Firm—Lowe Hauptman Gilman & Berner, LLP; Priest & Goldstein, PLLC

(57) ABSTRACT

A method of setting a key mapping used to generate key information from a keyboard responsive to manipulation of a key on the keyboard is described. A connected keyboard device having a programmable component is detected. A keyboard map usage corresponding to the detected keyboard device is determined. The keyboard map usage is transmitted to the programmable component of the keyboard device replacing a default keyboard map usage on the programmable component. The transmitted keyboard map usage may include a key matrix usage, a key matrix usage and a key matrix offset, or a plurality of key matrix usages. The keyboard map usage may remap one, some, or all of the keys on the keyboard. A corresponding keyboard, computer readable medium, and computer system for use with the present invention are also described.

39 Claims, 3 Drawing Sheets

KEYBOARD MATRIX DATA TRANSFER

FIELD OF THE INVENTION

The present invention is related to a method of and apparatus for keyboard matrix data transfer; and more particularly, to a method and apparatus for keyboard matrix data transfer using the Universal Serial Bus (USB) protocol.

BACKGROUND ART

It is known in the art to use different keyboards or keypads for different applications. For example, a telephone keypad differs from a calculator keypad primarily in the order of the keys. That is, the telephone keypad has numerals increasing in a left-to-right, top-to-bottom order and the calculator keypad has numerals increasing in a left-to-right, bottom-to-top order. Other examples of differing keyboard or keypad layouts include keyboards with different function keys and different languages.

In prior art systems, the different keyboard layouts required distinct keyboards or only permitted toggling between two predefined keyboard layouts. If a system required a numeric keypad of a keyboard to be used as the telephone keypad, then the keypad could only be used in the telephone keypad layout or the keypad layout must be toggled from one layout to the other. Any modification to keypad layout other than toggling between two layouts needed to be performed at the computer system receiving key information from a keypad. Any remapping of keys on the keypad required the computer system to remap the key information from one key layout to another. The prior approach adds complexity to the computer system and consumes additional computing resources of the computing system in order to perform the key mapping. Software, i.e., the operating system, on the computer system is required to monitor key information received from the keyboard and perform a remapping for each received key information. Additionally, use of the toggling approach limits the flexibility of the keypad to two predefined layouts in the keypad.

Another problem in prior art systems is that some keyboards have keys that are "double-high" or "double-wide." In such keyboards, two keys on the keyboard are replaced by a single larger key where two physical plungers under the large key must report a single value when either or both of the plungers are pressed. An example of a double-wide key is the space bar on a typical keyboard.

It is known in the art to connect keyboards, keypads, or other peripheral devices, to a computer by using different physical or logical connections. If the universal serial bus (USB) is the connection mechanism, key manipulation information is formed into packets with certain common USB characteristics and other characteristics specific to key manipulation, e.g., information identifying which key was manipulated or pressed.

The general protocol for transmitting data over USB is defined in specifications licensed by the USB Implementer's Forum (USBIF) or published by the USB device working group (DWG) on the public Web site, i.e., http://www.usb.org. Existing USB protocol definitions permit many different ways of transmitting data. For example, the USBIF defines four types of data transmission: control, interrupt, bulk, and isochronous. Each type of data transmission includes specific characteristics. A USB device may transmit data using one or more of the data transmission types, also known as endpoint types.

The USB DWG has defined several classes of devices. Each class uses a specified set of the above described endpoint types. Each class further specifies the format of the data to be transmitted. One such defined class is the human interface device (HID) class. The HID class, as defined by the USB DWG and specified in the Device Class Definition for Human Interface Devices (HID), hereinafter the HID specification, version 1.11 published Jun. 27, 2001 by the USBIF and available from http://www.usb.org, specifies some, but not all, of the characteristics of the transmitted data. More particularly, the HID class specifies a mechanism by which a device designer can provide extensions to the HID specification. These extensions are called usages, and a HID class device sends and receives data using either published, pre-defined usages, privately invented usages, or a combination of public and private usages. Furthermore, a HID class device formats data in a manner causing these usages to have specific, useful meaning to the host computer.

However, the HID Specification does not provide a capability to switch or modify keyboard layouts.

A specific example of keyboard layout mapping in the prior art is now provided to detail the importance of providing a mechanism for modifying the keyboard layout without requiring replacement of the keyboard. Although the example describes a retail scenario, the below-described present invention is not to be limited to such an implementation. There are numerous HIDs, scenarios, and implementations which could benefit from the ability to receive and update keyboard layout or matrix information.

It is known in the art to generate key manipulation information from a keyboard responsive to a user manipulating keys on a keyboard connected to a computer. As the user manipulates or clicks keys, information identifying the manipulated key is transferred to the computer.

A typical retail checkout stand 100 is now described with reference to FIG. 1. A customer (not shown) places items, e.g., grocery item 102, to be purchased on a conveyor belt 104. A cashier or clerk 106 moves grocery item 102 past a bar code scanner 108 to scan a bar code 110 on the grocery item to identify the item to be purchased by the customer. The scanner 108 transmits a signal representing the scanned bar code 110 to a computer system 112 (dashed line) located inside a cabinet 114 forming a part of checkout stand 100. In an alternate embodiment, the computer system 112 may be located remote from checkout stand 100 and send and receive signals over a network connection to the checkout stand.

If the item 102 does not have a bar code 110, or if the bar code scanner is unable to scan the bar code, clerk 106 must manually enter the bar code for the item using a keyboard 116. Clerk 106 manipulates keys on keyboard 116, connected to computer system 112, to provide the bar code information to the computer system.

Upon receipt of the bar code information, from either keyboard 116 or bar code scanner 108, computer system 112 performs a lookup to identify the item 102 and retrieves item information, e.g., item name and price information from memory.

Computer system 112 stores purchased item information and accumulates a total purchase price for the items in memory. The purchased item information and cumulative total purchase price are transmitted to a display 118 (described in detail below) for display to the customer and clerk 106. The item information is additionally transmitted to a receipt printer 120 for printing a receipt 122 to be provided to the customer at the completion of the transaction.

After the clerk 106 has scanned or manually entered (via keyboard 116) item information for all items, the customer tenders an amount of money to the clerk in payment. The money tendered may be in the form of cash, check, or debit or credit via a card reader 124 attached to checkout stand 100. Additionally, the customer may tender coupons, or other forms of payment to clerk 106. Card reader 124 is a typical card reader as is known to persons of skill in this art.

In operation, and with reference to FIG. 1, a clerk 106 uses a keyboard 116 to enter bar code information from items to be purchased. In some instances, the clerk enters item information directly, e.g., item type and price information. As the user manipulates the keys on the keyboard 116, the computer system 112 receives a signal from the keyboard providing key information indicating which key was pressed. If the keyboard includes double-high or double-wide keys, then computer system 112 receives plural signals from keyboard 116 and must determine if a double-high or double-wide key was pressed.

If a keyboard having a different key layout has replaced the existing keyboard, e.g., due to failure of the keyboard, error on the part of personnel, or other condition, then computer system 112 must be reconfigured to properly understand key information received from the new keyboard. Therefore, there is a need in the art for a method and apparatus enabling the modification of a keyboard layout without requiring replacement of the keyboard.

DISCLOSURE/SUMMARY OF THE INVENTION

It is therefore an object of the present invention to provide a method and apparatus for key matrix data transfer.

Another object of the present invention is to provide a method and apparatus for modifying key mapping on keyboards using a universal serial bus.

In accordance with a method aspect a key mapping used to generate key information from a keyboard responsive to manipulation of a key on the keyboard is set. A connected keyboard device having a programmable component is detected. A keyboard map usage corresponding to the detected keyboard device is determined. The keyboard map usage is transmitted to the programmable component of the keyboard device replacing a default keyboard map usage on the programmable component. The transmitted keyboard map usage may include a key matrix usage, a key matrix usage and a key matrix offset, or a plurality of key matrix usages. The keyboard map usage may remap one, some, or all of the keys on the keyboard.

In another embodiment, a method of configuring a keyboard to generate key information responsive to manipulation of keys on the keyboard is used. A connected keyboard and corresponding keyboard information are detected and used to determine a keyboard map usage corresponding to the detected keyboard information. The determined keyboard map usage is transferred to the connected keyboard.

In still another embodiment, a keyboard for generating key manipulation information responsive to manipulation of a key on the keyboard is described. The keyboard includes a plurality of keys, a programmable component, and a data connection to interface with a computer. The programmable component is responsive to key manipulation on the keyboard to generate key manipulation information. The programmable component is also responsive to receiving a keyboard map usage over the data connection where the received keyboard map usage modifies the key manipulation information provided by the programmable component. The data connection passes key manipulation information and receives the keyboard map usage.

In still another aspect, a computer readable medium includes at least one sequence of machine executable instructions and at least one keyboard map usage. When the executable instructions are executed by a processor, the processor detects a connected keyboard device, determines a keyboard map usage corresponding to the detected keyboard device, and transmits the keyboard map usage to the keyboard device.

In still another aspect, a computer system includes a processor, a keyboard coupled to the processor and having a programmable component, and a memory coupled to the processor. The memory has stored sequences of instructions, which when executed by the processor, cause the processor to determine keyboard identifying information, determine a keyboard map usage corresponding to the keyboard identifying information, and transmit the keyboard map usage to the programmable component.

As used herein, the term "serial" refers to the "RS-232 family" of interfaces and the term "USB" refers to the standard(s) developed and published by the USBIF (Universal Serial Bus Implementer's Forum), recently incorporated under that name.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

BEST MODE FOR CARRYING OUT THE INVENTION

A computer system useable with a preferred embodiment of the present invention is now described with reference to FIG. 2.

Hardware Overview

Figure 1:
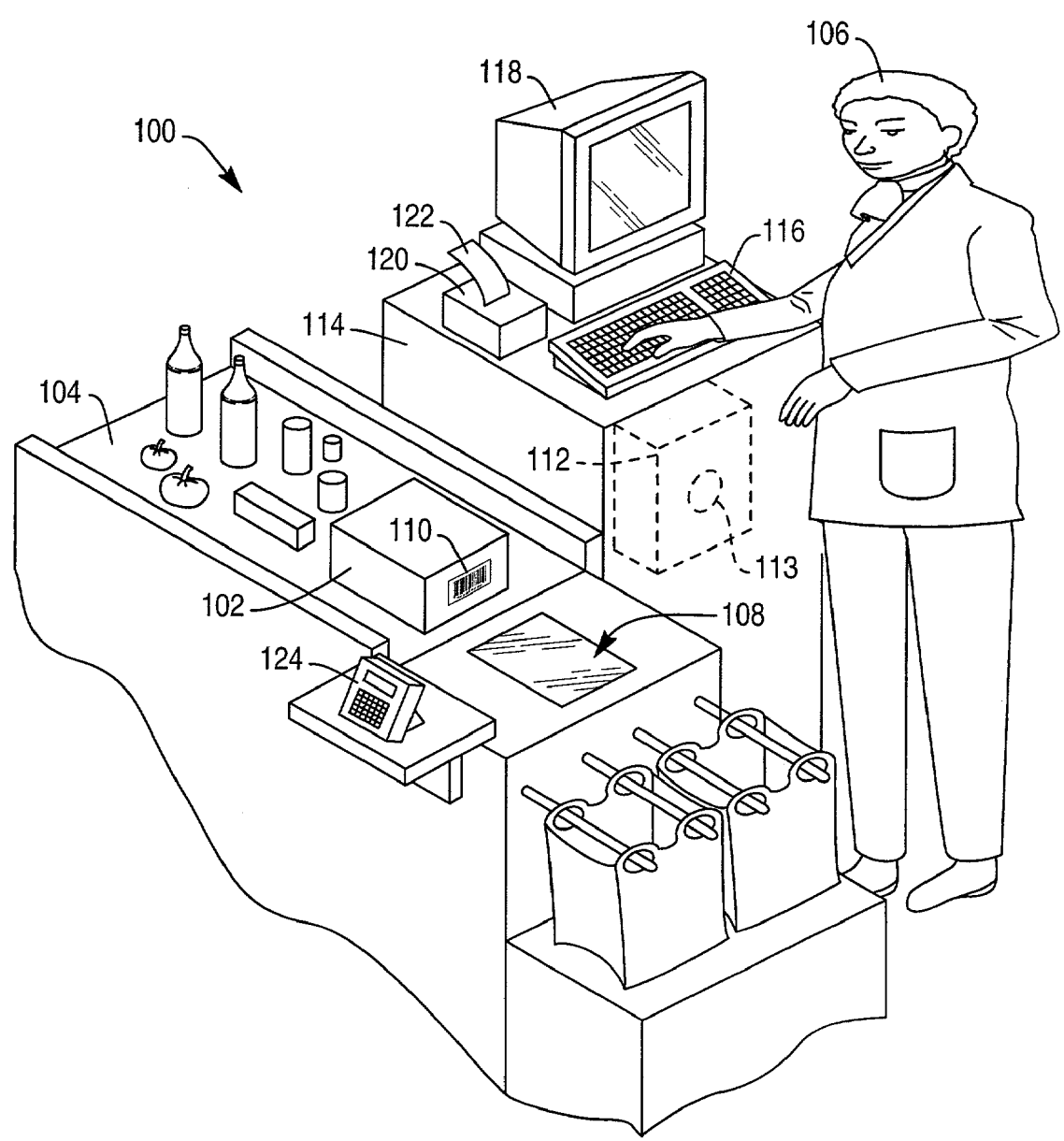
FIG. 1 is a diagram of a prior art system in use.
Figure 2:
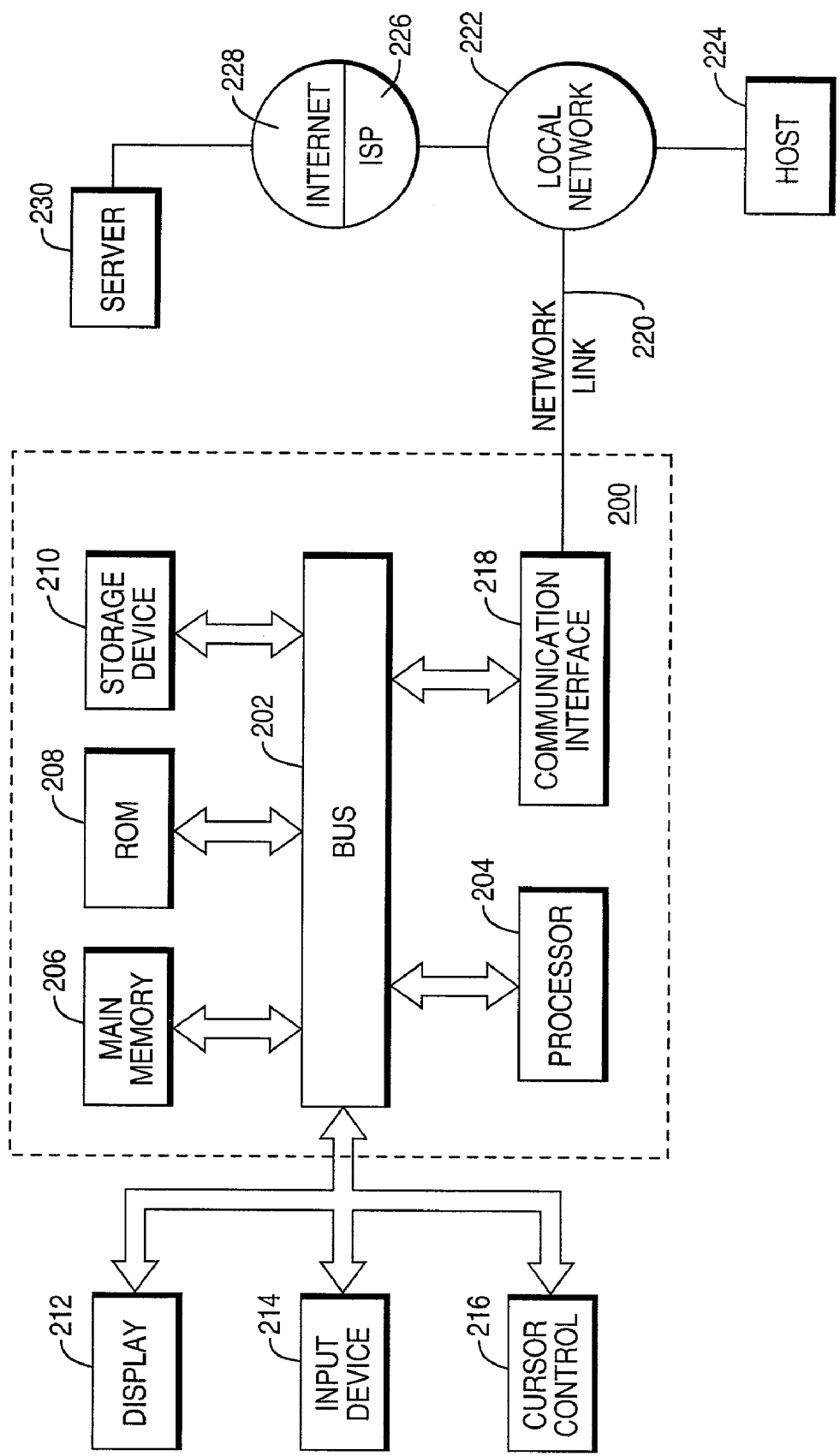
FIG. 2 is a high level block diagram of a computer system useable with a preferred embodiment of the present invention.

FIG. 2 is a block diagram illustrating an exemplary computer system 200 in conjunction with which a preferred embodiment of the invention may operate and be implemented. The present invention is usable with currently available personal computers, mini-mainframes and other computers having USB connectivity.

Computer system 200 includes a bus 202 or other communication mechanism for communicating information, and a processor 204 coupled with the bus 202 for processing information. Computer system 200 also includes a main memory 206, such as a random access memory (RAM) or other dynamic storage device, coupled to the bus 202 for storing USB usages, e.g., keyboard map usage, key matrix offset usage, and key matrix usage, data, and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to the bus 202 for storing static information and instructions for the processor 204. A storage device 210, such as a magnetic disk or optical disk, is provided and coupled to the bus 202 for storing USB usages, data, and instructions.

Computer system 200 may be coupled via the bus 202 to a display 212, such as a cathode ray tube (CRT) or a flat panel display, for displaying information to a user. An input device or human interface device (HID) 214, e.g., a keyboard or keypad including alphanumeric and function keys, is coupled to computer system 200 for communicating information and command selections to processor 204. HID 214 is a USB-based device and communicates with computer system 200 using the USB protocol as is known to persons of skill in the art and as modified below in accordance with the present invention. Another type of human interface device is cursor control 216, such as a mouse, a trackball, or cursor direction keys for communicating direction information and command selections to processor 204 and for controlling cursor movement on the display 212. This input device typically has two degrees of freedom in two axes, a first axis (e.g., x) and a second axis (e.g., y) allowing the device to specify positions in a plane.

The invention is related to the use of computer system 200, such as the illustrated system of FIG. 2, to transmit key matrix information in the form of novel USB HID usages, i.e., keyboard map usage, key matrix offset usage, and key matrix usage, to HID 214. According to one embodiment of the invention, the keyboard map usages are transmitted to HID 214 by computer system 200 in response to processor 204 executing sequences of instructions contained in main memory 206. Such instructions may be read into main memory 206 from another computer-readable medium, such as storage device 210.

However, the computer-readable medium is not limited to devices such as storage device 210. For example, the computer-readable medium may include a floppy disk, a flexible disk, hard disk, magnetic tape, or any other magnetic medium, a compact disc (CD-ROM), any other optical medium, punch cards, paper tape, any other physical medium with patterns of holes, a random access memory (RAM), a programmable ROM (PROM0, an erasable programmable ROM (EPROM), a flash-EPROM, any other memory chip or cartridge, a carrier wave embodied in an electrical, electromagnetic, infrared, or optical signal, or any other medium from which a computer can read. Execution of the sequences of instructions contained in the main memory 206 causes the processor 204 to perform the steps described below. In alternative embodiments, hard-wired circuitry may be used in place of or in combination with computer software instructions to implement the invention. Thus, embodiments of the invention are not limited to any specific combination of hardware circuitry and software.

Computer system 200 also includes a communication interface 218 coupled to the bus 202. Communication interface 218 provides two-way data communication as is known. For example, communication interface 218 may be an integrated services digital network (ISDN) card, a digital subscriber line (DSL) card, or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals which carry digital data streams representing various types of information. Of particular note, the communications through interface 218 may permit transmission or receipt of USB keyboard map usages. For example, two or more computer systems 200 may be networked together in a conventional manner with each using the communication interface 218.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals which carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218. In accordance with the invention, one such downloaded application provides for transmitting keyboard map usages to USB-based HID 214 for specification of key matrix information.

The received code may be executed by processor 204 as it is received, and/or stored in storage device 210, or other non-volatile storage for later execution. In this manner, computer system 200 may obtain application code in the form of a carrier wave.

Figure 3:
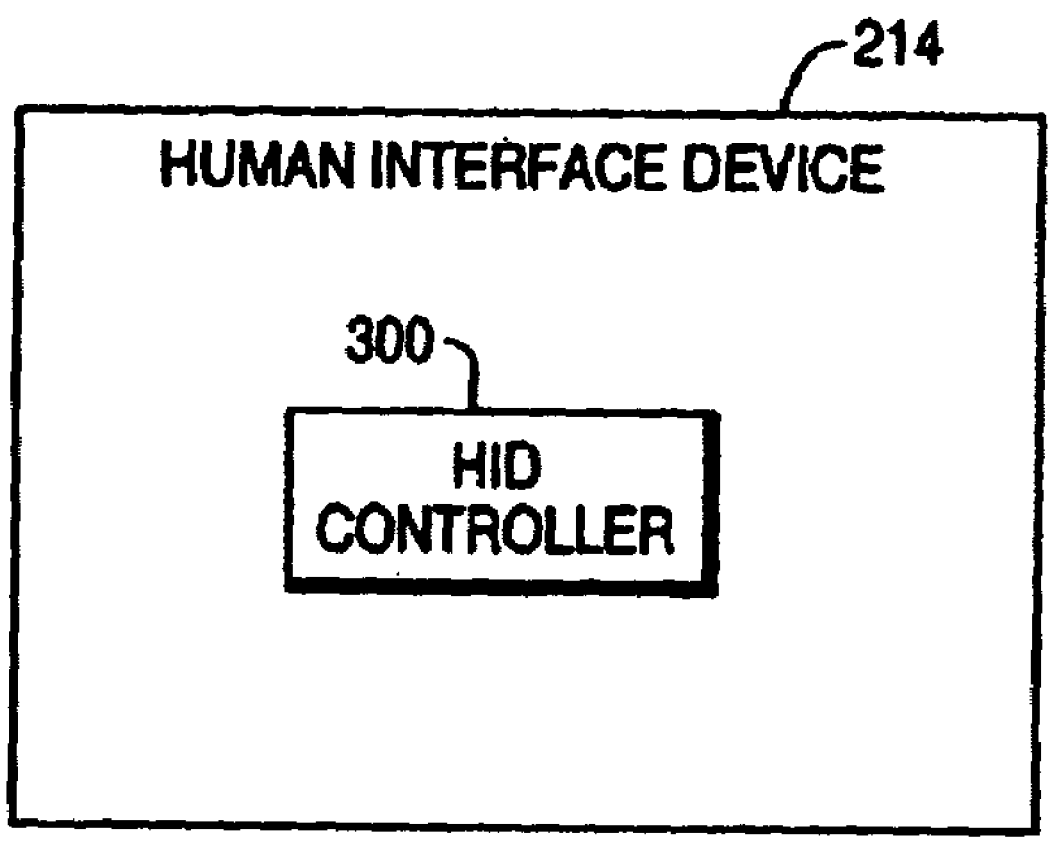
FIG. 3 is a functional block diagram of a keyboard used in the preferred embodiment of FIG. 2.

USB-based HID or keyboard 214 is now described in detail with reference to FIG. 3. HID 214 is connected to computer system 200 via USB. As depicted in FIG. 3, HID 214 includes a HID controller 300 for receiving commands from and transmitting information to computer system 200 using the USB. As described in detail below, HID controller 300 receives keyboard map usages, i.e., key matrix offset usage and key matrix usage, from computer system 200 and stores the usage information. HID controller 300 is a programmable logic device, e.g., a field programmable gate array (FPGA), and is known to persons of skill in the art. The usage information received by HID controller 300 from computer system 200 is stored in the HID controller by modifying the programming of the HID controller.

A detailed description of the keyboard map usages of the present invention is now provided.

Keyboard Matrix

The present invention transmits a key map using custom usages or parameter transfers: keyboard map usage, key matrix offset usage, and key matrix usage. The keyboard map usage is a collection defining an array or grouping of instances of the other usages as pertains to the keyboard map associated with a keyboard. The key matrix usage, which may be used with or without the key matrix offset usage, defines an entry in the keyboard map. For example, in a particular hardware implementation, the key in the upper left hand corner of keyboard or HID 214 may be at the physical intersection of row 1, column 1. Furthermore, when the keyboard detects that row 1, column 1 is pressed, position number 1 in the keyboard map may be selected.

The HID keyboard specification defines the value 41 as indicating the "Escape" key and value 42 as the "Delete" key being pressed. Thus, in the prior art approach, the keyboard map associates position number 1 on keyboard 116 with a value of 41 being transmitted to the computer system 112. Whenever the upper left key is pressed on keyboard 116, the keyboard reports to computer system 112 that the "Escape" key was pressed.

In the present invention, changing the value reported by keyboard 214 when the key in row 1, column 1 is pressed is accomplished by assigning the key matrix usage value of 42 to position 1, i.e., a key matrix offset value of zero, of the key map. Changing all of the values reported by keyboard 214 requires replacement values for all keys be transmitted using the key matrix usage.

Using the above approach, the keyboard map usage is used to define a collection of key matrix usages used to transfer keyboard map information to a physical keyboard using USB. In accordance with the HID Specification, top-level usages, such as the keyboard map usage, are transmitted in report descriptors at computer system 200 startup and/or connection of a HID device to the computer system. Report identifiers, as specified in the HID Specification, are used to correlate usages to reports but are not required for operation of the present invention.

The usage values may be transmitted over USB using multiple encoding schemes. For example, a pair of key matrix offset usage and key matrix usage values may be transmitted in a pair of 8 bit fields replacing a single value in the keyboard map. Alternatively, an array of 128 instances of key matrix usage values may be sent in 128 bytes to replace an entire keyboard map in a single transmission.

Two example keyboard matrices are now described.

Keyboard Matrix for 5932 USB Big Ticket Keyboard

The keyboard matrix comprises a list of key numbers and respective positions within a keyboard translation table. The matrix for a specific keyboard, i.e., 5932 USB Big Ticket Keyboard with a product ID of 0x0320, is contained in Appendix A. Appendix A as stored in HID controller 300 is byte-wide consecutive memory locations beginning with (0,0) and incrementing by rows (0 . . . 7) within columns (0 . . . 15).

The default keyboard map for the 5932 USB Big Ticket Keyboard (PID_0320) is shown in Appendix A. In Appendix A, "Key Number" and "FPGA Offset" (corresponding to key matrix offset) are in decimal, and "Usage" is in hexadecimal.

Keyboard Matrix for 5953 USB Dynakey Keypad

Similar to the keyboard matrix for the 5932 USB Big Ticket Keyboard described above, the keyboard matrix for another specific keyboard, i.e., the 5953 USB Dynakey Keypad, comprises a list of key numbers and respective positions within the keyboard translation table. The keyboard matrix for the 5953 USB Dynakey Keypad with a product ID of 0x0321 is contained in Appendix B. Appendix B as stored in HID controller 300 is 16-bit-wide consecutive memory locations beginning with (0,0) and incrementing by rows (0 . . . 7) within columns (0 . . . 7).

This mapping differs from the 5932 keyboard. In the case of the 5953 keyboard, each key maps to a 16-bit entry that contains two one-byte usages to be returned when The key on the keyboard 214 is pressed or manipulated by a user. This allows combinations of zero, one, or two usages to be reported for each key. Any capped key pair can report anywhere from zero to four usages. This is useful, for example, in emulating the 5932 dynakey, which produces a combination of "shift+function key" combinations.

The default keyboard map for the 5953 USB Big Ticket Keyboard (PID_0321) is shown in Appendix B. In Appendix B, "Key Number" and "FPGA Offset" (corresponding to key matrix offset) are in decimal, and "Usage" is in hexadecimal.

An exemplary implementation of a preferred embodiment of the present invention is now described.

Assuming HID controller 300 has no static memory and does not retain any settings after power loss, each time the system 200 to which keyboard or HID 214 is connected is powered-up, or any time keyboard 214 is connected to a powered system, HID controller 300 must be informed of any pertinent settings. In a preferred embodiment, the functionality of providing settings to HID controller 300 is performed by using an ActiveX/COM control object or executable software, known as UsbKeyboardCtl, providing a mechanism by which to set the keyboard features of "keyboard map."

Keyboard 214 defaults to a specific keyboard map. For specific embodiments in which a different keyboard map is desired, the UsbKeyboardCtl provides a means by which HID controller 300 is configured.

HID controller 300 is configurable by the UsbKeyboardCtl software component and a UsbKeyClickCtl software component, described in detail below. The UsbKeyboardCtl control is independent of other software components; however, other components are required to exercise the functionality of this component and are known to persons of ordinary skill in this art.

UsbKeyClickCtl may be invoked by: an application, e.g., SetUsbKeyClick, by appropriate enterprise management software, e.g., Fit Client Manager available from NCR, Inc., through a browser interface, or by an application able to load and exercise an ActiveX/COM control object.

UsbKeyClickCtl is an ActiveX control providing access to a method for downloading the key translation matrix information, i.e., SetKeyMatrix.

The SetKeyboardMatrix method examines all currently-enumerated HIDs connected to computer system 200 and finds the HIDs having a Vendor-ID equal to a particular HID vendor's assigned Vendor ID, e.g., 0x0404 in hexadecimal. Among all qualified devices found, each HID 214 is queried for a particular key map information setting, i.e., a KEYBOARD_MAP feature report containing an array of key matrix usages. When a matching device is found, e.g., keyboard 214, the device's product ID (PID) is used to locate key matrix parameters within computer system 200 memory, e.g., the Registry. The values found in the Registry are sent to the device, i.e., keyboard 214, in the KEYBOARD_MAP feature report. If no key matrix values are found in the Registry, no key matrix usage is transmitted to keyboard 214.

For each KEYBOARD_MAP device or HID 214 located above, the SetKeyboardMatrix method creates a full default keyboard matrix duplicating the factory-default matrix of the HID located. The Registry is read for replacement values within the keyboard matrix and all registry values found in the appropriate registry location are replaced within the default matrix. The full key matrix, as modified by the registry values, is transmitted to the HID 214 using the KEYBOARD_MAP feature report.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

What is claimed is:

1. A method for a first human interface device to emulate the operation of a second human interface device, the method comprising:
    detecting a human interface device being connected to a computer, the human interface device having a programmable component;
    transmitting a map usage to the human interface device;
    replacing a default map usage stored on the programmable component with the transmitted map usage; and
    generating manipulation information to the computer in response to manipulation of the first human interface device to emulate the second human interface, said manipulation information based on the map usage.

2. The method as claimed in claim 1, wherein the keyboard map usage is a key matrix usage and a key matrix offset usage.

3. The method as claimed in claim 1, wherein the keyboard map usage is a key matrix usage.

4. The method as claimed in claim 3, wherein the key matrix usage includes a keyboard map.

5. The method as claimed in claim 1, further comprising:
    storing the transmitted keyboard map usage at the human interface device.

6. The method as claimed in claim 5, further comprising:
    responsive to manipulation of a key on the human interface device, generating a key value at the human interface device based on the stored keyboard map usage.

7. A method of setting a key map used to generate key manipulation information from a keyboard responsive to manipulation of a key on the keyboard, the method comprising the following steps:
    detecting a keyboard connected to a computer, the keyboard having a programmable component;
    determining a keyboard map usage corresponding to the detected keyboard;
    transmitting the keyboard map usage to the programmable component of the keyboard;
    replacing a default map usage stored on the programmable component with the transmitted map usage; and
    generating key manipulation information from the keyboard in response to manipulation of a key on the keyboard, said key manipulation information based on the keyboard map usage.

8. The method as claimed in claim 7, wherein the connected keyboard is a universal serial bus device.

9. The method as claimed in claim 7, wherein the programmable component is a field programmable gate array.

10. The method as claimed in claim 7, wherein the transmitted keyboard map usage includes a key matrix usage.

11. The method as claimed in claim 7, wherein the transmitted keyboard map usage includes a plurality of key matrix usages.

12. The method as claimed in claim 7, wherein the transmitted keyboard map usage includes a key matrix usage and a key matrix offset usage.

13. The method as claimed in claim 7, wherein the transmitted keyboard map usage replaces a default keyboard map usage of the programmable component of the keyboard.

14. The method as claimed in claim 10, wherein the transmitted keyboard map usage remaps at least one key of the keyboard.

15. The method as claimed in claim 10, wherein the transmitted keyboard map usage remaps all keys of the keyboard.

16. A method of configuring a keyboard to generate key information responsive to manipulation of keys on the keyboard, the method comprising the following steps:
    detecting a keyboard connected to a computer and keyboard information;
    determining a keyboard map usage corresponding to the detected keyboard information;
    transferring the keyboard map usage to the connected keyboard;
    replacing a default map usage stored on the programmable component with the transmitted map usage; and
    generating key information from the keyboard in response to manipulation of a key on the keyboard, said key information based on the transferred keyboard map usage.

17. The method as claimed in claim 16 wherein the keyboard information includes a vendor identifier and a product identifier.

18. The method as claimed in claim 16 wherein the keyboard map usage is a key matrix usage.

19. The method as claimed in claim 16 wherein the keyboard map usage is a key matrix usage and a key matrix offset usage.

20. A keyboard for generating key manipulation information responsive to manipulation of a key on the keyboard, comprising:
    a plurality of keys;
    a programmable component responsive to key manipulation and a keyboard map usage;
    a data connection adapted to receive the keyboard map usage, to replace a default keyboard map usage, if one exists, and to pass key manipulation information based on the keyboard map usage to emulate the operation of a second keyboard.

21. The keyboard as claimed in claim 20, wherein the data connection is a universal serial bus.

22. The keyboard as claimed in claim 20, wherein the programmable component is a field programmable gate array.

23. The keyboard as claimed in claim 20, wherein the received keyboard map usage replaces a default keyboard map usage of the programmable component of the keyboard.

24. The keyboard as claimed in claim 20, wherein the received keyboard map usage includes at least one key matrix usage.

25. The keyboard as claimed in claim 20, wherein the received keyboard map usage includes a plurality of key matrix usages.

26. The keyboard as claimed in claim 20, wherein the received keyboard map usage includes a key matrix usage and a key matrix offset usage.

27. The keyboard as claimed in claim 20, wherein the received keyboard map usage remaps at least one key of the keyboard.

28. The keyboard as claimed in claim 20, wherein the received keyboard map usage remaps all keys of the keyboard.

29. A computer readable medium, comprising:
at least one sequence of machine executable instructions;
at least one key map;
a medium bearing the executable instructions in machine form and a key map, wherein execution of the instructions by one or more processors causes the one or more processors to:
detect a connected keyboard device;
determine a keyboard map usage corresponding to the detected keyboard device; and
transmit the keyboard map usage to the keyboard device.

30. The computer readable medium as claimed in claim 29, wherein the keyboard map usage includes at least one key matrix usage.

31. The computer readable medium as claimed in claim 29, wherein the keyboard map usage includes a plurality of key matrix usages.

32. The computer readable medium as claimed in claim 29, wherein the keyboard map usage includes a key matrix usage and a key matrix offset usage.

33. The computer readable medium as claimed in claim 29, wherein the keyboard map usage remaps at least one key of the keyboard device.

34. A computer system, comprising:
a processor;
a keyboard coupled to the processor and having a programmable component; and
a memory coupled to the processor, the memory having stored therein sequences of instructions, which when executed by the processor, causes the processor to perform the steps of:
determining keyboard identifying information;
determining a keyboard map usage corresponding to the keyboard identifying information; and
transmitting the keyboard map usage to the programmable component for replacement of a default keyboard map usage, the keyboard generates manipulation information to the processor in response to manipulation of the keyboard, said manipulation information based on the keyboard map usage.

35. The computer system as claimed in claim 34, wherein the keyboard map usage includes at least one key matrix usage.

36. The computer system as claimed in claim 34, wherein the keyboard map usage includes a plurality of key matrix usages.

37. The computer system as claimed in claim 34, wherein the keyboard map usage includes a key matrix usage and a key matrix offset usage.

38. The computer system as claimed in claim 34, wherein the keyboard map usage remaps at least one key of the keyboard.

39. The computer system as claimed in claim 34, wherein the keyboard map usage remaps all keys of the keyboard.

* * * * *